(12) United States Patent
Hornaman

(10) Patent No.: US 6,884,830 B1
(45) Date of Patent: Apr. 26, 2005

(54) FLEXIBLE SETTING JOINT COMPOUND AND METHOD FOR MAKING FLEXIBLE JOINTS

(75) Inventor: E. Chris Hornaman, Allentown, PA (US)

(73) Assignee: Air Products Polymers, L.P., Allentown, PA (US)

(*) Notice: Subject to any disclaimer, the term of this patent is extended or adjusted under 35 U.S.C. 154(b) by 515 days.

(21) Appl. No.: 09/655,899

(22) Filed: Sep. 6, 2000

(51) Int. Cl.⁷ .............................................. C04B 24/26
(52) U.S. Cl. ...................................... 524/5; 524/4; 524/8
(58) Field of Search ................................ 524/428, 522, 524/523, 524, 4, 5–8; 156/305, 327; 106/772, 778; 526/329; 252/607, 608, 609; 528/920

(56) References Cited

U.S. PATENT DOCUMENTS

| | | | |
|---|---|---|---|
| 3,297,601 A | | 1/1967 | Maynard et al. ............ 260/17.4 |
| 3,350,372 A | * | 10/1967 | Anspon et al. |
| 3,947,398 A | | 3/1976 | Williams .................... 260/29.6 |
| 4,042,409 A | * | 8/1977 | Terada et al. .................. 524/5 |
| 4,238,239 A | | 12/1980 | Brown ......................... 106/116 |
| 4,543,386 A | | 9/1985 | Padget et al. ................ 524/523 |
| 4,661,161 A | * | 4/1987 | Jakacki et al. |
| 4,746,365 A | * | 5/1988 | Babcock et al. ................ 524/8 |
| 4,826,907 A | * | 5/1989 | Murao et al. ................ 524/394 |
| 4,849,018 A | * | 7/1989 | Babcock et al. ................ 524/8 |
| 4,972,013 A | * | 11/1990 | Koltisko, Jr. et al. ....... 524/211 |
| 5,340,392 A | * | 8/1994 | Westbrook et al. |
| 5,494,947 A | | 2/1996 | Kaplan ........................ 523/122 |
| 5,653,797 A | * | 8/1997 | Patel ........................... 106/781 |
| 5,670,726 A | * | 9/1997 | Kolaska et al. ............. 428/40.1 |
| 5,700,852 A | * | 12/1997 | Iwanaga et al. ............. 523/201 |
| 5,725,656 A | * | 3/1998 | Shimanovich et al. ...... 106/778 |
| 5,746,822 A | | 5/1998 | Espinoza et al. |
| 5,779,786 A | * | 7/1998 | Patel ........................... 106/778 |
| 5,879,825 A | * | 3/1999 | Burke et al. ................. 428/703 |
| 6,171,388 B1 | * | 1/2001 | Jobbins ....................... 106/778 |
| 6,200,380 B1 | * | 3/2001 | Finkelstein et al. ......... 106/778 |
| 6,228,163 B1 | * | 5/2001 | Espinoza et al. ............ 106/778 |
| 6,248,806 B1 | * | 6/2001 | Codolar et al. ............. 523/177 |

FOREIGN PATENT DOCUMENTS

| | | | |
|---|---|---|---|
| GB | 2 228 931 A | | 9/1990 |
| JP | 57456 | * | 3/1987 |

OTHER PUBLICATIONS

Grant & Hackh's Chemical Dictionary, Fifth Edition, Roger and Claire Grant, p. 619, 1987.*

* cited by examiner

Primary Examiner—Peter Szekely
(74) Attorney, Agent, or Firm—Mary E. Bongiorno

(57) ABSTRACT

A flexible setting type hydraulic joint compound and a method of forming flexible joints. The flexible joint compound of this invention primarily contains 2 to 20 parts by weight of an emulsion polymer having a $T_g$ that is less than about −40° C., and 22 to 44 parts by weight of total water, based on 100 parts by weight calcium sulfate hemihydrate filler. It can be applied to joints between two adjacent sheets of gypsum board to form a flexible joint that is resistant to cracking.

12 Claims, No Drawings

FLEXIBLE SETTING JOINT COMPOUND AND METHOD FOR MAKING FLEXIBLE JOINTS

BACKGROUND OF THE INVENTION

When gypsum board panels (also known as "dry wall" in the industry) or the like are used as a wall surfacing in the construction of houses and other structures, joint compounds are typically used in combination with a paper or mesh tape material to close and fill the joints and corners between adjoining panels.

Joint compounds typically are provided and marketed in one of two forms—single component or ready mix which is a finished formulation ready to apply needing only stirring before application and two component setting dry mix which is in the form of a dry free-flowing powder to which water is added and stirred until a workable consistency is attained.

The two main components of joint compounds are a filler and a binder. Conventional fillers are inert such as calcium carbonate and calcium sulfate dihydrate (gypsum), and reactive such as calcium sulfate hemihydrate. The type of filler determines whether the joint compound is a setting or a drying compound.

A major portion of the filler in setting joint compounds is calcium sulfate hemihydrate. Optionally, small portions of inert fillers such as calcium carbonate, talc, mica, silica, clays, expanded perlite, calcium sulfate dihydrate, and other mineral fillers can be added to setting type joint compounds. The calcium sulfate hemihydrate takes up some of the water in the mix by hydration to form calcium sulfate dihydrate crystals when the compound sets. The balance of water evaporates or is absorbed into the substrate.

Calcium carbonate is normally the major portion of filler in drying type joint compounds. Optionally, small portions of inert fillers such as talc, mica, silica, clays, expanded perlite, and other mineral fillers can also be added to drying type joint compounds. Hardening occurs as the water is eliminated through evaporation or absorption into the substrate.

A binder serves to provide cohesive strength to the joint compound and to bond the compound to a surface. Examples of typical binders are poly(vinyl acetate), vinyl acetate copolymers, and poly(vinyl alcohol).

In a widely used technique for filling gypsum board joints, water is added to a dry mixture containing calcium sulfate hemihydrate to form a high viscosity joint compound paste which is applied in order to close the joint. A fiberglass, cloth, or paper taping material is then stretched over the joint and embedded in the soft joint compound. An overlayer or top dressing of the joint compound is applied over the taping material to completely fill the joint and provide a smooth surface. After setting, the top dressing can optionally be sanded to smooth out irregularities prior to painting or applying a wall covering, or other finishing material.

By adjusting the catalysts and retarders present in the joint compound the setting time can be adjusted to meet the requirements of the applicator.

One problem with conventional setting or drying type joint compounds is their friability. Cracks can develop if the joint is subject to movement either during cure or drying or after the joint compound has set or dried.

An application in which particular problems occur is factory manufactured houses or manufactured house modules. When components such as ceiling and walls are moved about during the construction process joint movement can occur and cracking can occur. Also, as the partially completed structure is moved through the various manufacturing steps the joints are subject to movement that can cause cracks. Additionally, as the completed structure is moved from the point of manufacture to another site the structure is subjected to bending, racking and twisting motion that can cause joints to flex and crack. The action of transport can result in excessive mechanical stress that causes cracks to form in the joints of the fabricated gypsum board surfaces.

An example of drying type compounds for flexible joints is described in U.S. Pat. No. 5,494,947. They contain an acrylate, a biocide, a reinforcing agent, a latex, surfactants, a plasticizer, coalescents, a fungicide and a filler. The compounds described in this patent are deficient in that the time to effect drying is long and unsuitable for the rapid assembly techniques used in factory assembled structures.

Traditional setting type compositions provide the rapid hardening needed for factory assembled structures but do not have sufficient flexibility and crack if the joint is subjected to movement.

Examples of compositions that combine emulsion polymers with one or more fillers are described below:

U.S. Pat. No. 3,297,601 (Maynard, et al., 1967) discloses a substantially dry joint compound containing calcium sulfate hemihydrate, poly(vinyl acetate) and starch which, when mixed with water, can be used for finishing joints. Low shrinkage and relatively fast set times are reported.

U.S. Pat. No. 3,947,398 (Williams, 1976) discloses a surfacing composition comprising gypsum plaster and an aqueous emulsion of polymer resin. The polymer resin is usually a polymer of ethylenically unsaturated monomers such as vinyl resins and polymers of acrylates and methacrylates. Styrene/acrylic copolymers are preferred. The resins desirably set to a resin phase which is hard at room temperature (65° F.) The proportion of dry resin solids is 10 to 35 wt %, based on the weight of dry plaster solids. Preferred compositions are reported to be ideally suited for domestic and industrial flooring.

U.S. Pat. No. 4,238,239 (Brown, 1980) discloses a dry wall joint compound containing a powdered mixture of 27 to 41 wt % gypsum, 24 to 38 wt % hydrated gypsum, 16 to 26 wt % calcium carbonate, 5 to 9 wt % plaster of paris, 4 to 6 wt % hydrated amorphous silica, and 1 to 3 wt % talc. The dry wall joint compound can be mixed with water or an aqueous mixture of 0.35 to 8 wt % zinc oxide, 0.35 to 1.5 wt % sodium acetate, 0.35 to 3 wt % ammonium alum, and 0.35 to 8 wt % of an acrylic resin. to form a dry wall joint cement. The joint cement is reported to be resistant to cracking and shrinkage.

The need remains in the industry for quick setting hydraulic joint setting compounds that prevents cracking of joints, especially during transport of prefabricated modules.

BRIEF SUMMARY OF THE INVENTION

This invention is directed to a flexible setting hydraulic joint compound and to a method of forming flexible joints in adjacent panels of gypsum board. The flexible joint compound of this invention primarily contains 100 parts by weight calcium sulfate hemihydrate reactive filler, 2 to 20 parts by weight of an emulsion polymer having a glass transition temperature ($T_g$) of less than about −40° C., and additional water for a total water content of 26 to 44 parts by weight. Emulsion polymers of this invention are water based. The emulsion polymer functions as an adhesion promoter and as a binder for the joint compound. Optionally, one or more other binders, such as a modified cellulose or poly(vinyl alcohol), can be added. The setting type joint compound can also optionally contain small portions of inert fillers such as calcium carbonate, talc, mica, silica, clays, expanded perlite, and other mineral fillers. In addition to the above components, the joint compound can optionally contain other components such as a surfactant, an accelerator to reduce the set time, retarders to slow the set time, and pigments for color. The hydraulic joint compound can be applied to a joint between two adjacent sheets of gypsum board. Optionally, a layer of tape can be applied to the joint before the setting type hydraulic joint compound is applied or the hydraulic joint compound can be used to embed a layer of tape. Additionally, the setting type joint compound can be used to fill the indentations made when nails or screws are used to attach the dry wall to the substructure or to fill other imperfections.

The setting type hydraulic joint compound of this invention provides the following advantages:

setting time can be two hour or less in the absence of an accelerator;

joint remains flexible during and after setting of the compound;

cracking at the joint is eliminated; and the need for paper tape in the joint can optionally be eliminated.

BRIEF DESCRIPTION OF SEVERAL VIEWS OF THE DRAWINGS

Not applicable.

DETAILED DESCRIPTION OF THE INVENTION

Key ingredients of the setting type hydraulic joint compound of this invention are shown in the table below:

| Ingredient | Amount* | Preferred Amount* | Most Preferred Amount* |
|---|---|---|---|
| Calcium sulfate hemihydrate | 100 | 100 | 100 |
| Emulsion polymer having a $T_g$ of less than about - 40° C. (solids). | 2 to 20 | 8 to 16 | 11 to 14 |
| Total water (includes water in emulsion polymer). | 26 to 44 | 26 to 44 | 33 to 41 |
| Inert fillers, such as calcium carbonate, calcium sulfate dihydrate, clays, expanded perlite, mica, silica, and talc. | 0 to 20 | 1 to 15 | 1 to 15 |
| Additional surfactant. | 0 to 5 | 0.1 to 1.0 | 0.1 to 0.2 |
| Accelerator. | 0 to 5 | 0 to 5 | 0 to 5 |

*Parts by weight

Emulsion polymers appropriate for this invention are those that have a $T_g$ of less than about −40° C.; preferably less than about −45° C. Examples of appropriate emulsion polymers are homo- and copolymers of ethylenically unsaturated compounds, such as vinyl acetate; ethylene; vinyl versatate; $C_3$–$C_{10}$ alkenoic acids, such as acrylic acid, methacrylic acid, crotonic acid and isocrotonic acid and their $C_1$ to $C_{18}$ alkyl esters, such as, methyl, propyl, butyl, and 2-ethylhexyl ester, or esters with $C_1$–$C_{18}$ alkanols, such as methanol, ethanol, propanol, butanol, and 2-ethylhexanol; vinyl halides, such as vinyl chloride; alpha, beta-unsaturated $C_4$–$C_{10}$ alkenedioic acids such as maleic acid, fumaric acid, and itaconic acid and their monoesters and diesters with the same $C_1$–$C_{18}$ alkanols; and nitrogen containing monoolefinically unsaturated monomers, particularly nitriles, amides, N-methylol amides, $C_1$–$C_4$ alkanoic acid ethers of N-methylol amides and allylcarbamates, such as acrylonitrile, acrylamide, methacrylamide, N-methylol acrylamide, N-methylol methacrylamide, N-methylol allylcarbamate, and $C_1$–$C_4$ alkyl ethers or $C_1$–$C_4$ alkanoic acid esters of N-methylol acrylamide, N-methylol methacrylamide and N-methylol allylcarbamate. Copolymers of 2-ethylhexyl acrylate and one or more other ethylenically unsaturated compound are preferred.

Polymer emulsions typically contain stabilizing agents, such as surfactants and/or protective colloids. Additional surfactants, such as sodium dodecyl benzene sulfonate and alkyl naphthalene sulfonate and other alkyl substituted aromatic sulfonates can be used to assist in the wetting out of the surface to which the joint compound is applied and to improve the wetting out of the solids in the setting compound during mixing.

Conventional accelerating agents or catalysts can be used with the calcium sulfate hemihydrate if required to adjust the setting time of the mixture. Examples of appropriate accelerators are ammonium sulfate, calcium sulfate, copper sulfate, ferrous sulfate, magnesium sulfate, potassium aluminum sulfate (alum), potassium sulfate, sodium bisulfate, sodium sulfate, and zinc sulfate.

The amount of water added is dependent on the viscosity needed for application by known conventional methods used in the application of joint compounds.

The joint composition can be supplied as a two part system in which the dry components (e.g., calcium sulfate hemihydrate and pigment powder) are in one part and the liquid components (e.g., polymer emulsion and water) are supplied as a second part.

The invention will be further clarified by a consideration of the following examples, which are intended to be purely exemplary of the invention.

EXAMPLE 1

Setting compounds containing several latex polymers were tested for flexibility and cracking. The compounds consisted of 100 parts of a dry mix containing calcium sulfate hemihydrate, about 4% silica, 2% alumina, and small amounts of other clay-type minerals; 28 parts water, and 14.3 parts of a polymer emulsion. The joint between adjacent panels of gypsum board was filled with the setting compound. No tape was used in any of the samples.

Flexibility was measured by bending the joint until the first sign of cracking failure occurred and recording the angle at failure.

The procedure for determining cracking on drying is a modification of ASTM Method C-474. A wedge shaped draw down of the mixed joint compound was made on a piece of gypsum board. The wedge tapered from ⅛' thickness at the thickest side to 0 on the other side. Cracking was measure on an arbitrary scale ranging from 1 (best) to 9 (severe) depending on the thickness of the sample where cracking appeared.

Results of the tests are shown in Table 1.

TABLE 1

| Latex | | | | | | Crack- | Set | |
|---|---|---|---|---|---|---|---|---|
| Type (14.3 g) | Tg | Solids | PHR Dry | Water (g) | Flex Angle, ° | ing on drying | Time, Min. | Observation |
| None | | | | 28.6 | 10 | 1.0 | 35 | Creamy |
| Flexbond ® 165 2-ethylhexyl acrylate copolymer | −48 | 69.0 | 9.9 | 17.1 | 90 | 1.0 | 94 | Creamy, thick, slightly lumpy |
| Valtac ® 56 2-ethylhexyl acrylate copolymer | −42 | 48.0 | 6.9 | 17.1 | 65 | 1.5 | >360 | Creamy, thick, slightly lumpy |
| Airflex ® 600BP VAE/Acrylate copolymer | −40 | 55.0 | 7.9 | 24.6 | 10 | 1.0 | >150 | Creamy, Thick and airy |
| Rhoplex ® N-1031 butyl acrylate polymer | <−40 | | | 37.1 | — | — | — | Coagulated |
| Rhoplex ® N-580 butyl acrylate polymer | <−40 | | | 32.9 | — | — | — | Coagulated |
| Rhoplex ® N-619 butyl acrylate polymer | <−40 | | | 34.3 | — | — | — | Coagulated |
| Flexbond ® 149 VAc/dioctyl maleate copolymer | −30 | 50.0 | 7.1 | 25.7 | 10 | 2.0 | 36 | Some lumps |
| Flexbond ® 150 VAc/dioctyl maleate copolymer | −28 | 50.0 | 7.1 | 24.3 | 10 | 1.5 | 37 | Mix had few lumps |
| Airflex ® 500 VAE copolymer | 0 | 55.0 | 7.9 | 18.6 | 20 | 1.5 | 54 | Creamy, Slightly grainy |
| Airflex ® 525 VAE copolymer | 0 | 55.0 | 7.9 | 20.0 | 10 | 3.0 | 37 | Creamy, Some lumps |
| Airflex ® 809 VAE copolymer | 0 | 55.0 | 7.9 | 20.9 | 20 | 1.5 | 56 | Creamy, Few lumps |
| Airflex ® 728 VAE/vinyl chloride terpolymer | 0 | 55.0 | 7.9 | 20.0 | 20 | 3.0 | 168 | Creamy, Few lumps |

PHR = parts per hundred of dry mix
VAE = vinyl acetate/ethylene
VAc = vinyl acetate
Flexbond, Valtac, and Airflex products supplied by Air Products and Chemicals, Inc. Rhoplex products supplied by Rohm and Haas.

The data in Table 1 show that compositions containing an emulsion polymer with a $T_g$ of less than about −40° C. had a greater flexibility based on the angle at which failure occurred than other emulsion polymers; however, some emulsion polymers, such as Valtac 56, retarded the hydration so much that the mix did not cure but rather just dried out over a period of several hours. They were flexible but, due to the setting properties, would have little practical value. For example, a mixture of dry components of the setting type joint compound and Valtac 56 did not set after 24 hours. All samples containing an emulsion polymer showed an increase of set time compared to the sample containing no emulsion polymer.

EXAMPLE 2

The procedure of Example 1 was followed using 25.7 g, instead of 14.3 g, of several emulsion polymers. Results are summarized in Table 2.

TABLE 2

| Latex | | | | | | | |
|---|---|---|---|---|---|---|---|
| Type | Tg | Solids | PHR Dry | Water (g) | Flex Angle, ° | Cracking | Set Time, Min | Observation |
| Flexbond 165 | −8 | 69.0 | 17.7 | 10.0 | 100 | 1.0 | 90 | |
| Valtac 56 | −42 | 48.0 | 12.3 | 7.1 | 100 | 1.0 | >120 | |
| Flexbond 149 | −30 | 50.0 | 12.9 | 20.0 | 10 | 5.5 | 34 | Mix was very lumpy |
| Flexbond 150 | −28 | 50.0 | 12.9 | 18.6 | 20 | 5.5 | 40 | Mix was creamy, few lumps |

Data presented in Table 2 show that a higher level of emulsion polymers having a $T_g$ lower than about −40° C. improved joint flexibility. However, for emulsion polymers having a $T_g$ higher than about −40° C. (Flexbond 149 and Flexbond 150), joint flexibility was not improved by using a higher amount of polymer.

EXAMPLE 3

The following formulation was used to compare the effect of various additional surfactants on the workability of the joint compound of this invention. The results are presented in Table 4.

| Ingredient | Weight, g |
|---|---|
| Water | 22.5 |
| Additional Surfactant | 0.25 |
| Flexbond 165 emulsion | 13.5 |
| Calcium sulfate hemihydrate* | 100 |

*contains about 4% silica, 2% alumina, and minor amounts of other inorganic oxides.

TABLE 3

| Surfactant | | | | | | |
|---|---|---|---|---|---|---|
| Name and Description | % active | Type | HLB | Texture | Workability | Appearance |
| None | | | | Slightly Thick | | Slightly Grainy |
| Rhodacal ® DS-10 sodium dodecyl benzene sulfonate | 100 | Anionic | | Creamy | Good | Smooth |
| Pluronic ® 17R2 ethylene oxide and propylene oxide block copolymer | 100 | Non-ionic | 2 to 7 | Creamy | Good | Slightly Grainy |
| Triton ® X-15 octylphenoxy-polyethoxy-ethanol | 100 | Non-ionic | 3.6 | Creamy | Good | Slightly Grainy |
| Surfynol ® 104H tetramethyl decyne diol solution in ethylene glycol | 75 | Non-ionic | 4 | Creamy | Good | |
| Triton ® X-35 octylphenoxy-polyethoxy-ethanol | 100 | Non-ionic | 7.8 | Creamy | Good | Grainy |
| Span ® 85 sorbitan trioleate | 100 | Non-ionic | 1.8 | Creamy | Good | Grainy |
| Surfynol ® TG surfactant blend | 83 | Non-ionic | 9 to 10 | Thick | Poor | Grainy |
| Pluronic ® L61 ethylene oxide and propylene oxide block copolymer | 100 | Non-ionic | 1 to 7 | Thick | Poor | Grainy |
| Surfynol ® DF110D high molecular weight acetylenic diol | 100 | Non-ionic | 3 | Thick | Poor | Grainy |
| Surfynol ® 465 ethoxylated tetramethyl decynediol | 100 | Non-ionic | 13 | Thick | Poor | Grainy |
| Triton ® X-100 octylphenoxy-polyethoxy-ethanol | 100 | Non-ionic | 13.5 | Thick | Poor | Grainy |
| Triton ® X405 octylphenoxy-polyethoxy-ethanol | 70 | Non-ionic | 17.9 | Thick | Poor | Grainy |
| Rhodacal ® DSB disodium alkyl diphenyloxide sulfonate | 45 | Anionic | | Thick | Poor | Grainy |

Rhodacal products supplied by Rhodia; Pluronic products supplied by BASF; Triton products supplied by Union Carbide; Surfynol products supplied by Air Products and Chemicals, Inc.; Span 85 supplied by Uniqema.

The data of Table 4 show that several surfactants enhanced the workability of the joint compound. Rhocacal DS-10 gave the best workability.

What is claimed is:
1. A flexible setting joint compound comprising, for each 100 parts by weight calcium sulfate hemihydrate:
2 to 20 parts by weight (solids) of an emulsion polymer having a $T_g$ of less than about −40° C.;
26 to 44 parts by weight total water;
0 to 20 parts by weight inert filler;

0 to 5 parts by weight additional surfactant; and
0 to 5 parts by weight of an accelerator.

2. The flexible setting joint compound of claim 1, comprising, for each 100 parts by weight calcium sulfate hemihydrate:
8 to 16 parts by weight of the emulsion polymer solids;
26 to 44 parts by weight total water;
2 to 4 parts by weight inert filler;
0.1 to 1.0 parts by weight additional surfactant; and
0 to 5 parts by weight accelerator.

3. The flexible setting joint compound of claim 1, comprising for each 100 parts by weight calcium sulfate hemihydrate:
11 to 14 parts by weight of the emulsion polymer solids;
33 to 41 parts by weight total water;
2 to 4 parts by weight inert tiller;
0.1 to 0.2 parts by weight additional surfactant; and
0 to 5 parts by weight accelerator.

4. The flexible setting joint compound of claim 1, wherein the emulsion polymer is a homopolymer of an ethylenically unsaturated compound or a copolymer of one or more ethylenically unsaturated compounds, said ethylenically unsaturated compounds selected from the group consisting of vinyl acetate, ethylene, a $C_3$–$C_{10}$ alkenoic acid, a $C_1$ to $C_{18}$ alkyl ester of a $C_3$ to $C_{10}$ alkenoic acid, a $C_1$–$C_{18}$ alkanol ester of a $C_3$–$C_{10}$ alkenoic acid, a vinyl halide, an alpha, beta-unsaturated $C_4$–$C_{10}$ alkenedioic acid, a $C_1$ to $C_{1-8}$ alkyl ester of an alpha, beta-unsaturated $C_4$–$C_{10}$ alkenedioic acid, a $C_1$ to $C_{18}$ alkanol diester of an alpha, beta-unsaturated $C_4$–$C_{10}$ alkenedioic acid, a nitrile, an amide, N-methylol allylcarbamate, a $C_1$–$C_4$ alkyl ether of N-methylol allylcarbamate, and a $C_1$–$C_4$ alkanoic acid ester of N-methylol allylcarbamate.

5. The flexible setting joint compound of claim 1 wherein the emulsion polymer is a copolymer of 2-ethylhexyl acrylate and one or more other ethylenically unsaturated compound.

6. The flexible setting joint compound of claim 1 wherein the inert filler comprises one or more of calcium carbonate, calcium sulfate dihydrate, clay, expanded perlite, mica, silica, or talc.

7. A method for producing flexible joints comprising:

a) supplying a first planar substrate having a first edge;
b) abutting a second edge of a second planar substrate against said first edge of the first planar substrate, thereby forming a joint;
c) applying a setting hydraulic joint compound to the joint, said joint compound comprising, for each 100 parts by weight calcium sulfate hemihydrate:
2 to 20 parts by weight (solids) of an emulsion polymer having a $T_g$ of less than about –40° C.;
26 to 44 parts by weight total water;
0 to 20 parts by weight inert filler;
0 to 5 parts by weight additional surfactant; and
0 to 5 parts by weight of an accelerator;

d) allowing the joint compound to set.

8. The method of claim 7 wherein the joint compound comprises, for each 100 parts by weight calcium sulfate hemihydrate:
8 to 16 parts by weight of the emulsion polymer solids;
26 to 44 parts by weight total water;
2 to 4 parts by weight inert filler;
0.1 to 1.0 parts by weight additional surfactant; and 0 to 5 parts by weight accelerator.

9. The method of claim 7 wherein the joint compound comprises, for each 100 parts by weight calcium sulfate hemihydrate:
11 to 14 parts by weight of the emulsion polymer solids;
33 to 41 parts by weight total water;
2 to 4 parts by weight inert filler;
0.1 to 0.2 parts by weight additional surfactant; and
0 to 5 parts by weight accelerator.

10. The method of claim 7, wherein the emulsion polymer is copolymer of 2-ethylhexyl acrylate and one or more other ethylenically unsaturated compound.

11. The method of claim 7, wherein the inert filler comprises one or more of calcium carbonate, calcium sulfate dihydrate, clay, expanded perlite, mica, silica, or talc.

12. The method of claim 7, wherein paper or mesh tape is embedded in the joint compound prior to d).

* * * * *